Feb. 7, 1939.  D. B. BAKER ET AL  2,146,169
FINAL DRIVE TRANSMISSION ASSEMBLY
Filed July 17, 1937  3 Sheets-Sheet 1

Inventors
David B. Baker
Clifford R. Rogers,
and William O. Bechman
By V. F. Lasagne
Atty.

Patented Feb. 7, 1939

2,146,169

UNITED STATES PATENT OFFICE 2,146,169

FINAL DRIVE TRANSMISSION ASSEMBLY

David B. Baker, Riverside, Clifford R. Rogers, Oak Park, and William O. Bechman, Chicago, Ill., assignors to International Harvester Company, a corporation of New Jersey Application July 17, 1937, Serial No. 154,221

13 Claims. (Cl. 180—9.2)

The invention relates to a final drive transmission assembly for track type tractors.

Standard vehicles of this type embody an endless, self-laying track at each side of a central body, said body carrying final drive transmission mechanism for driving sprocket wheels provided respectively for the tracks. Interposed in this mechanism are a pair of steering clutches by means of which the operator may control steering movements of the tractor in the well known manner.

In the larger sizes of such tractors, these steering clutches are of the multiple disk type and are of considerable size and weight. As a consequence, removing the clutches for repairs and service has involved much time and labor. It is desirable, therefore, to provide an assembly which will make the task of removing the said clutches simple, easy, and time-saving without requiring other collateral parts to be disturbed or initially removed, the body or transmission housing having openings in the top thereof through which the clutches may be removed.

In some tractors the two steering clutches are carried on a common drive shaft and in removing the clutches the whole assembly of shaft and clutches must be removed together at one time. Such removal practically has to be done in a well equipped service station because of the weight of the assembly handled. In still other tractors, while the clutches may be taken out one at a time, nevertheless, a real task is involved, since the drive shaft and certain coaxial auxiliary shafts must be removed from the body in an endwise direction and through the space between a pair of adjacent spokes in the track sprocket drive wheels. In this latter construction then, certain parts must initially be removed through the sides of the body before the clutches may be removed through the openings in the top thereof.

In the structure of the present invention this disassembly and removal of the steering clutches is accomplished in a far simpler and effective manner, and entirely through the top of the final drive transmission housing, thus making it unnecessary to disturb the track-driving sprocket wheels or the associated endless self-laying tracks.

The principal object of the invention is to provide an improved final drive assembly for self-laying track tractors embodying features that will make possible the easy removal of the steering clutches.

Another important object is to provide for such removal of these clutches without disturbing the self-laying tracks or their driving sprocket wheels.

Still another object of the invention is to provide a final drive housing having top openings through which all operations in connection with removal of the clutches are effected, said clutches likewise being removable vertically through said top openings.

Other important objects will be apparent to those versed in this art as the disclosure is more fully made.

These desirable objects are attained by the structure illustrated in the accompanying sheets of drawings wherein is shown the rear portion of a tractor body formed as a housing having three compartments across which is mounted a transverse drive shaft formed of demountable portions, certain of which include the steering clutches which are adapted for removal through the open top side of the housing, all as will later more fully appear.

In the drawings:—

Figure 1:
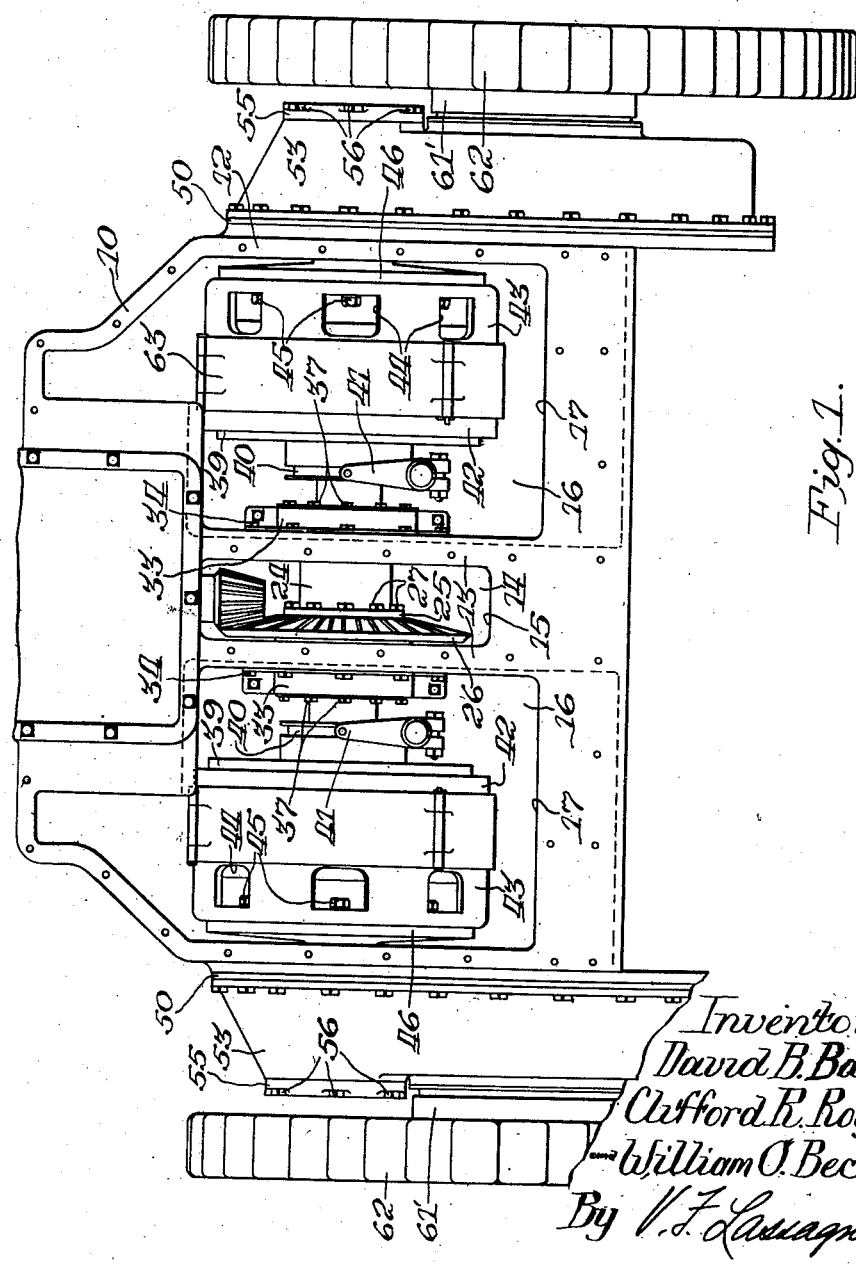
Figure 1 is a general plan view of the rear end of a tracklaying tractor showing the final drive transmission housing and related parts.

The body of the tractor is formed at its rear end as a transmission housing 10 which may be considered to be generally rectangular in shape after the fashion of a box, having a closed bottom 11, opposite side or end walls 12, and a pair of longitudinally running, parallel, relatively closely spaced inner walls 13. The top of this housing, or box structure, is open. Thus, the central compartment between the two walls 13 is identified by the numeral 14, the same being open at its one face or top as at 15, and on opposite sides the inner walls 13 with their adjacent respective side or end walls 12 form end compartments 16, each of which is open at its top as indicated at 17. Cover plates, not shown, serve to close the openings 15 and 17 in any desired manner.

Figure 2:
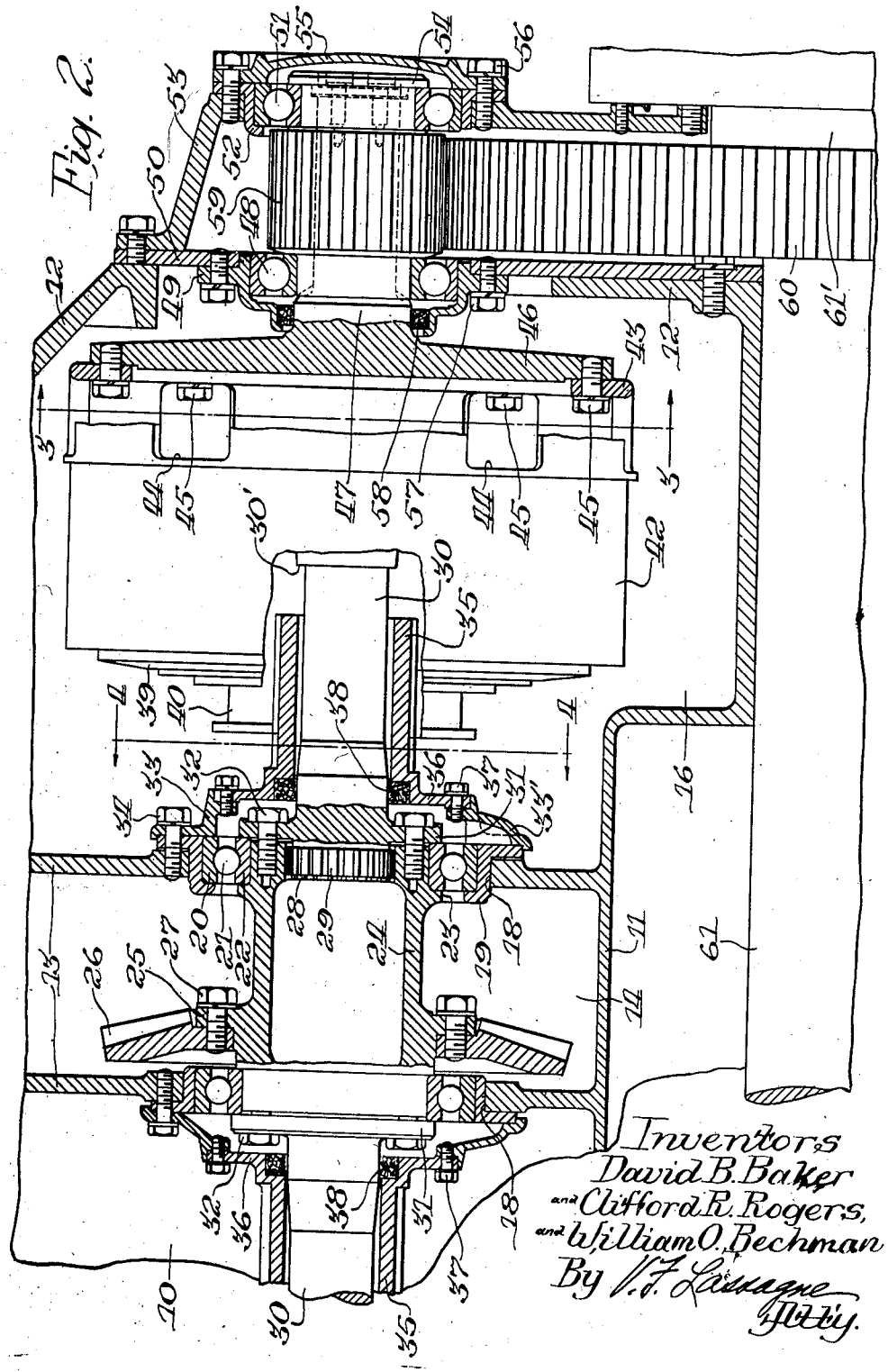
Figure 2 is a general vertical transverse sectional view on an enlarged scale of one side of the final drive transmission assembly.
Figure 3:
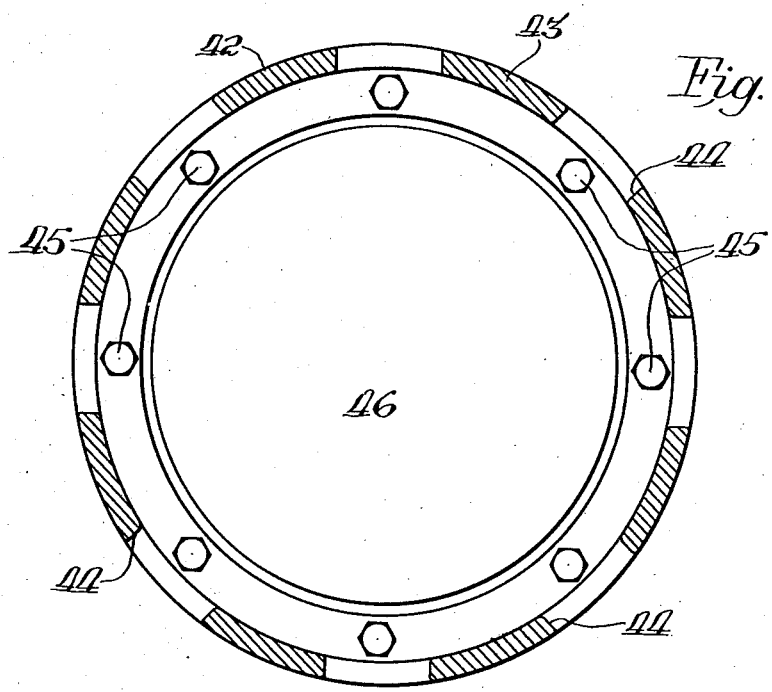
Figure 3 is a detail sectional view taken along the line 3—3 of Figure 2 looking in the direction of the arrows; and, Figure 4 is a detail sectional view taken along the line 4—4 of Figure 2 looking in the indicated direction.
Figure 4:
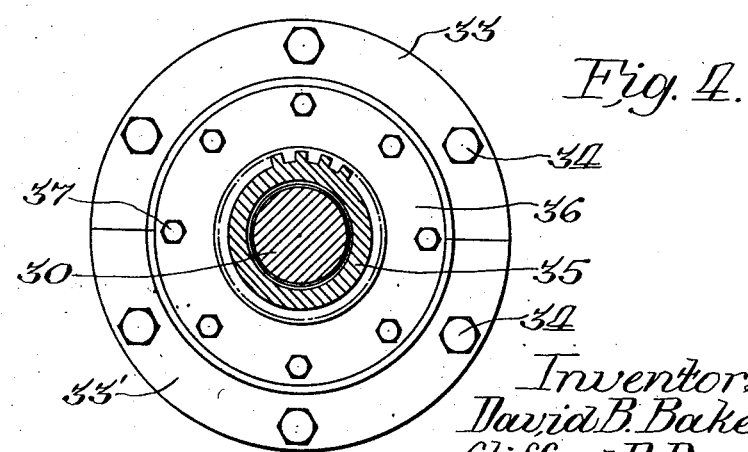

The adjacent inner walls 13 are formed with transversely aligned openings 18, in each of which is located a cup shaped carrier ring 19 for retaining the outer race 20 of a ball bearing 21, in turn having an inner race 22 which is fitted against the shoulders 23 of a tubular or hollow shaft part or sleeve 24. Thus, the carrier rings 19 disposed in each wall 13 serve to support ball bearings 21, in turn serving to journal opposite ends of the short sleeve shaft 24 the ends of which are disposed in the respective openings 18 in the adjacent inner walls 13. The outer diameter of the shaft part 24 is formed with an annular flange 25 to which is secured a bevel ring gear 26 by means of a circle of bolts 27, as shown in Figure 2. This bevel gear 26 is adapted to be driven in a conventional manner from the complementary bevel gear on a power output shaft of any conventional change speed gear set located in the body 10 in advance of the compartment 14.

Opposite ends of the hollow shaft part 24 are open and formed with an internal splined portion 28 to receive the complementary external splined end 29 of a coaxial, intermediate shaft part or power shaft 30 which, adjacent its splined end 29, is formed with an external, annular flange 31 through which are passed appropriate bolts 32 in the usual circle arrangement securely to fasten said shaft part 30 to the inner shaft 24, it being understood that there is a shaft 30 on each side of the housing 10 with one running across each of the two compartments 16 and extending in opposite directions, as shown. It will be noticed that the outer edge of the flange 31 serves to hold the inner race 22 of the bearing 21 in position against the shoulder 23. A split retainer ring, formed of an upper half part 33 and a lower half part 33', is arranged to abut the vertical flange of the carrier ring member 19 and a circle of bolts 34 serves to clamp this assembly of parts securely together. A sleeve 35 is concentrically disposed around the respective shaft portions 30 and spaced therefrom as shown, the inner ends of each of these sleeves 35 including an integral vertical annular flange 36 which is secured by a circle of bolts 37 to the retainer ring 33—33', said flange 36 being formed with an annular pocket in which is arranged an appropriate oil seal 38 to prevent oil which is contained in the compartment 14 from leaking through the shaft assembly described and the walls 13 into the compartments 16, which latter compartments respectively contain the two dry plate steering clutches which will presently be described.

Each shaft part 30 has spline connected to it for rotation therewith in the usual manner the driving portion 39 of a multiple disk clutch of any standard construction, which includes a grooved hub extension 40 to receive a shifter 41 so that the clutch may be released, it being understood that the clutch is of that type well known in the art including springs which normally hold the clutch engaged to transmit driving force. The usual clutch release collar is not shown but in any well known manner is carried on the sleeve 35. The driven half of the clutch structure surrounds the driving half and is shown at 42, the same being coupled in driving relation with and to a cup shaped carrier member 43, which latter member is formed with circumferentially spaced openings 44 inside of which are located bolts 45 whereby the driven portion 42—43 of the clutch may be securely fastened to an annular disk 46 which is integrally formed with a transversely extending stub shaft 47 which passes through an inner ball bearing 48 held in place by a carrier 49 in an opening formed in a cover plate 50 arranged flatly against the outer face of the adjacent side walls 12 of the final drive housing. This shaft 47 constitutes a pinion drive shaft and is also coaxially disposed with respect to the shaft part 30 and 24, heretofore described, the outer end of said pinion drive shaft 47 extending axially within the inner race ring of a suitable bearing 51 held in place by a carrier 52 in an appropriate opening within a side cover 53, the shaft further being held against endwise displacement by a retaining means 54 closed by an auxiliary cap or cover 55 to make the same accessible, there being provided bolts 56 for holding this assembly together. The retainer 49, heretofore described, is held in place by a ring of bolts 57, and a seal 58 is held in place between the carrier 49 and shaft 47 to prevent oil from within the cover housing 53 leaking into the dry clutch compartment 16. The pinion shaft 47 is externally splined and a drive pinion 59 is splined thereto in driving relation to a large spur gear 60 driven from the pinion 59, which spur gear 60, in the well known manner, is journaled on the end of a transverse dead axle 61 journaled in the lower portion of the body as is well understood in this art. The pinion 59 is provided at opposite sides with integral sleeve portions which fit the inner race rings of the bearings 48 and 51, the pinion being thereby journaled in said bearings. Since the stub shaft part 47 fits the pinion, said shaft is adequately supported by the bearings. This arrangement is desirable inasmuch as it permits axial removal of the stub shaft 47, and its integral disk 46, from the pinion without disturbing the disposition of the pinion, as will be referred to later. Similarly, the pinion 59 may be removed axially outwardly from the stub shaft 47 without disturbing the position of said shaft. The spur gear 60 is integrally formed with a sleeve or hub 61' to which is made fast the track drive sprocket wheel 62 disposed exteriorly of the cover housing 53. It is to be understood, of course, that the structure on both sides of the tractor is the same, as generally indicated in Figure 1.

It will be understood that between the driving portion 39 of the clutch and the driven part 42 thereof is disposed the usual multiple disk arrangement for frictionally transmitting the driving effect of the shaft part 30 to the adjoining pinion shaft 47 which is coaxially disposed with respect to the shaft 30 so that across the width of the tractor the central shaft part 24, the two opposite shaft parts 30, and the two opposite pinion shaft parts 47 are all coaxially related. By virtue of this shaft structure arranged as described, portions thereof can be removed to facilitate said disassembly of the steering clutches 42, as will be described, these steering clutches 42 being surrounded by brake bands 63 in the well known manner which may be applied at the will of the operator for augmenting the steering movements of the tractor in the well known manner.

In steering the tractor of this construction, as is well known in the art, if the right-hand clutch is disengaged then no power goes to the right-hand track, and with the left-hand clutch continually engaged the left-hand track is continued to be driven and as a result the tractor turns to the right. With the right-hand clutch engaged and the left-hand clutch disengaged, the tractor turns to the left. A skilled operator by frictionally slipping the respective clutches develops a nicety of control to effectuate comparatively smooth turning movements in either direction. The constant use of these clutches makes it imperative from time to time that they be inspected and, in fact, removed from the housing containing the same for adjusting, repairing, and otherwise servicing said clutches. These clutches, in the larger size tractors, are of considerable size and relatively great weight, and the structure of this invention is so arranged that these large clutches may be removed in a facile manner from the housing 10 individually and without disturbing the track drive sprockets or the tracks; in fact, the structure in the said housing 53 remains in position when the clutches are removed. The manner of removing a clutch will now be described.

The cover plate, not shown, which covers the top openings 15 and 17 will be removed after the usual superstructure, such as the driver's seat and the like, have been removed from the tractor. The operator with a wrench can reach down into the compartment 16 to remove the bolts 37 so that the operator can grasp the sleeve extension 35 and telescope the same into the clutch until the end thereof abuts a shoulder 30' on the clutch hub. Carried on and surrounding this sleeve 35 is the usual clutch release collar bearing, which is not shown, and it is to be understood that this remains in place on the sleeve 35 except that it will be disconnected from the lever 41. Next, the circle of bolts 34 is removed so that the ring 33 may be removed along with its split portion 33'. When the sleeve 35 is telescoped into the clutch, it exposes the lower ring of bolts 34 in the split ring part 33'. With these parts so far removed, the circle of bolts 32 is exposed so that a wrench may be applied thereto for removing the same to free the inner end of the shaft portion 30 from the inner hollow shaft part 24 to which it was attached. Next, the operator, still working through the top opening 17, places a wrench on the bolt heads 45 to unfasten the same from the annular disk 46, each bolt head 45 being brought into position at the top of the compartment 16 by turning the clutch to make said bolt heads 45 accessible in an obvious manner. Eventually, when all of these bolts 45 are removed, the entire clutch assembly of driven and driving portions has been freed respectively from the driving shaft and the driven shaft side so that the entire clutch assembly comprising the shaft 30, the driving portion 39, and driven portion 42—43 may be bodily lifted with the sleeve part 35 out of the compartment 16 as a unit, it being understood that the splined part 29 slips out of the splined part 28 without hindering such upward withdrawal of the clutch unit. In this fashion either driving clutch may be removed from its compartment without disturbing the other clutch, it being obvious, of course, that the brake bands 63 respectively surrounding the clutches must first be removed. In restoring the clutch after it has been repaired into its driving position between the shafts, the reverse operations, obviously, are performed.

If it is desired to withdraw the drive pinion shaft 47 from the housing 53, the cap 55 is removed to make accessible the retainer structure 54 which also is removed, and thereupon the operator may grasp the driver disk 46 (it being assumed now that the clutch is removed) and withdraw the same laterally and upwardly from the bearings 48 and 51 and out of the pinion 59 in which it is splined, the pinion remaining journaled in the bearings 48 and 51 in its original position. In other words, this pinion shaft integrally formed with the disk 46 may be withdrawn inwardly into the compartment 16 and then upwardly out of the opening 17.

With the clutches on both sides so removed and with the ring gear 26 removed from the flange 25 by removal of the bolts 27, it is a simple matter to withdraw the hollow shaft part 24 from the compartment 14 endwise into the compartment 16 and up through the opening 17 therefor, since by now this part 24 can be shifted endwise, with the flange 25 readily passing through the opening 18 in an adjacent wall 13 since it is of smaller diameter than said opening. The loosened ring gear 26 may then be removed upwardly through the opening 15.

From this disclosure, it can now be appreciated that an improved final track drive and steering control assembly has been provided which enables the final drive shaft to be dismounted in sections as desired to facilitate the ready removal of the parts and particularly the large, heavy, oppositely disposed steering clutches forming an important part thereof.

It is the intention to cover all changes and modifications of the structure shown and described which do not in material respects constitute departures from the spirit and scope of the invention as hereinafter claimed.

What is claimed is:

1. In a final drive transmission comprising a housing having a bottom, two spaced middle walls providing a middle compartment and an end wall providing a side compartment, said compartments being open at the top, said walls having transverse axially alined openings therein, each opening removably carrying a carrier and bearing, the bearings in the middle walls journaling a shaft part at its ends, a second shaft part axially and removably secured to an end of the first shaft part and extending into the side compartment, a stub shaft journaled in the end wall bearing and including a disk disposed in the side compartment adjacent the end wall, a clutch unit comprising driving and driven parts located in the side compartment, means removably securing the driven clutch part to the disk, the driving clutch part being secured to the second shaft part, a sleeve surrounding the second shaft part and extending partly into the clutch unit, an annular retainer bolted to the adjacent carrier on a middle wall, a flange included in the sleeve, and bolts for removably and non-rotatably securing the sleeve to the retainer.

2. In a final drive transmission comprising a housing having a bottom, two spaced middle walls providing a middle compartment and an end wall providing a side compartment, said compartments being open at the top, said walls having transverse axially alined openings therein, each wall in its opening removably carrying a carrier and bearing, the bearings in the middle walls journaling a hollow shaft part at its ends, a second shaft part axially and telescopically splined into the hollow shaft and having a flange removably secured to an end of the first shaft part and extending into the side compartment, a stub shaft journaled in the end wall bearing and including a disk disposed in the side compartment, a clutch unit comprising driving and driven parts located in the side compartment, means removably securing the driven clutch part to the disk, the driving clutch part being secured to the second shaft part, a sleeve surrounding the second shaft part and extending partly into the clutch unit, an annular retainer bolted to the adjacent carrier on a middle wall, a flange included in the sleeve, bolts for removably and non-rotatably securing the sleeve to the retainer, and means included in the said retainer for holding the bearing in the carrier.

3. In a final drive transmission comprising a housing having a bottom, two spaced middle walls providing a middle compartment and an end wall providing a side compartment, said compartments being open at the top, said walls having transverse axially alined openings therein, each wall in its opening removably carrying a carrier and bearing, the bearings in the middle walls journaling a shaft part at its ends, a second shaft part axially and removably secured to an end of the first shaft part and extending into the side compartment, a stub shaft journaled in the end wall bearing and including an integral disk disposed in the side compartment, a clutch unit comprising driving and driven parts located in the side compartment, means removably securing the driven clutch part to the disk, the driving clutch part being secured to the second shaft part, a sleeve surrounding the second shaft part and extending partly into the clutch unit, an annular retainer bolted to the adjacent carrier on a middle wall, and means for removably and non-rotatably securing the sleeve to the retainer.

4. In a final drive transmission comprising a housing having a bottom, two spaced middle walls providing a middle compartment and an end wall providing a side compartment, said compartments being open at the top, said walls having transverse axially alined openings therein, each wall in its opening removably carrying a carrier and bearing, the bearings in the middle walls journaling a shaft part at its ends, a second shaft part axially and removably secured to an end of the first shaft part and extending into the side compartment, a stub shaft journaled in the end wall bearing and including an integral disk disposed in the side compartment, a clutch unit comprising driving and driven parts located in the side compartment, means removably securing the driven clutch part to the disk, the driving clutch part being secured to the second shaft part, a sleeve surrounding the second shaft part and extending partly into the clutch unit, an annular retainer bolted to the adjacent carrier on a middle wall, a flange included in the sleeve, and bolts for removably and nonrotatably securing the sleeve to the retainer, said retainer being diametrically split to form two separately removable halves.

5. In a final drive transmission assembly for crawler tractors comprising a housing having opposite side walls and two relatively closely spaced middle walls, said walls being vertical and parallel to provide a central compartment and two side compartments, the housing having a bottom and access to each compartment being through the top of the housing, the combination with said walls of transversely alined bearing carriers respectively carried removably in openings formed in said middle walls, bearings in said carriers, a transverse shaft part journaled in said bearings and carrying between the middle walls a drive gear, a coaxial shaft part connected removably to each end of said first shaft part respectively extending into each side compartment, a steering clutch disposed in each side compartment, each clutch having a driving part fast on the adjacent shaft part, each driving clutch part including a non-rotatable sleeve surrounding the shaft part and having a flange secured to an adjacent middle wall, each side wall provided with a bearing and carrier, a stub shaft journaled in each last mentioned bearing and extending into the adjacent side compartment coaxially with the other shaft parts, each stub shaft including a disk portion inside the side compartments, and a driven clutch part respectively detachably connected to the said disks in operative relation to the driving clutch parts, said clutches each as a unit being removable through the top openings of the side compartments upon separation of the non-rotatable sleeves from the middle walls and the driven clutch parts from the disks on the stub shafts.

6. In a final drive transmission assembly for crawler tractors comprising a housing having opposite side walls and two relatively closely spaced middle walls, said walls being vertical and parallel to provide a central compartment and two side compartments, the housing having a bottom and access to each compartment being through the top of the housing, the combination with said walls of transversely alined bearing carriers respectively carried removably in openings formed in said middle walls, bearings in said carriers, a transverse sleeve journaled in said bearings and carrying between the middle walls a drive gear, a coaxial shaft part connected telescopically and removably to each end of said sleeve and respectively extending into each side compartment, a steering clutch disposed in each side compartment, each clutch having a driving part fast on the adjacent shaft part, each driving clutch part including a non-rotatable sleeve surrounding the shaft part and having a flange secured to an adjacent middle wall, each side wall provided with a bearing and carrier, a stub shaft journaled in each last mentioned bearing and extending into the adjacent side compartment coaxially with the shaft parts, each stub shaft including an integral disk portion inside the side compartments, and a driven clutch part respectively detachably connected to the said disks in operative relation to the driving clutch parts, said clutches each as a unit being removable through the top openings of the side compartments upon separation of the non-rotatable sleeves from the middle walls and the driven clutch part from the disks on the stub shafts.

7. In a final drive transmission assembly for crawler tractors comprising a housing having opposite side walls and two relatively closely spaced middle walls, said walls being vertical and parallel to provide a central compartment and two side compartments, the housing having a bottom and access to each compartment being through the top of the housing, the combination with said walls of transversely alined coaxial shaft parts, comprising a middle shaft part journaled at its ends respectively in the middle walls, opposite second shaft parts removably secured to opposite ends of the middle shaft part and extending into the side compartments respectively, opposite stub shaft respectively journaled in the side walls, and removably mounted clutch units carried by the second and stub shafts within said side compartments respectively, said clutch units being removable through the top openings in said side compartments.

8. In a final drive transmission assembly for crawler tractors comprising a housing having opposite side walls and two relatively closely spaced middle walls, said walls being vertical and parallel to provide a central compartment and two side compartments, the housing having a bottom and access to each compartment being through the top of the housing, the combination with said walls of transversely alined coaxial shaft parts, comprising a middle shaft part journaled at its ends respectively in the middle walls, opposite second shaft parts removably secured to opposite ends of the middle shaft part and extending into the side compartments respectively, opposite stub shafts respectively journaled in the side walls, and removably mounted clutch units carried by the second and stub shafts within said side compartments respectively, said clutch units being removable through the top openings in said side compartments, said second shaft parts including a sleeve non-rotatably surrounding the said second shaft parts respectively and removably secured to the adjacent middle wall, said sleeves when removed from the said walls being respectively adapted to telescope into the respective clutch units to facilitate removal of the latter.

9. In a track-type tractor having a body portion provided with a pair of transversely spaced and alined compartments, a pair of steering clutch units for steering the tractor located respectively in the compartments, each unit comprising driving and driven elements, the driven elements being connected respectively to oppositely disposed final drive elements at the sides of the body portion, and a pair of power shafts mounted for rotation in the compartments and removably interconnected at their inner ends for conjoint rotation, the outer end of each shaft terminating within the compartment and being connected for rotation with the driving element of the respective clutch unit.

10. In a track-type tractor having a body portion provided with a pair of transversely spaced and alined compartments each open at one face, a pair of steering clutch units located respectively in the compartments, said units being removable from the compartments through the aforesaid open faces, each unit including driving and driven elements, the driven elements being removably connected within the respective compartments to oppositely disposed track drive mechanism at the sides of the body, a pair of power shafts disposed respectively in transverse axial alinement in the compartments, the inner ends of the shafts being disposed in axially spaced relation, and means disposed between said inner ends interconnecting the shafts for conjoint rotation, an outer portion of each shaft being connected for rotation to the driving element of the respective clutch unit.

11. In a track-type tractor having a body portion provided with a middle and two outer compartments in substantially transverse alinement and each open at one face, a pair of steering clutch units located respectively in the two outer compartments, said units being removable from the compartments through the aforesaid open faces, each unit including driving and driven elements, the driven elements being removably connected within the respective compartments to oppositely disposed track driving mechanism at the sides of the body, a pair of power shafts disposed respectively in transverse axial alinement in the outer compartments, the inner ends of said shafts extending a short distance into the middle compartment, and means disposed between said inner ends interconnecting the shafts for conjoint rotation, said means being disposed within and journaled in the middle compartment, an outer portion of each shaft being connected for rotation with the driving element of the respective clutch unit.

12. In a track-type tractor having a body portion formed with a middle and two outer compartments in transverse alinement, and housings at opposite sides of the body portions containing drive gearing for opposite track chains, each having journaled therein a drive pinion formed with an axial splined bore, final drive mechanism for the drive gearing comprising a shaft assembly including axially alined shaft parts extending transversely across the compartments and into the opposite housings, a stub shaft part at each end of the assembly being splined and telescopically connected to each of the aforesaid pinions, a shaft part being journaled in the middle compartment and being power driven, a pair of intermediate shaft parts being disposed between the stub shaft parts and the middle shaft part and connected for rotation with said middle part, a pair of steering clutch units for the drive gearing interposed in the shaft assembly, one located in each outer compartment and each including a driven element connected for rotation with the respective stub shaft, and a driving element connected for rotation with the respective intermediate shaft.

13. In a crawler tractor having a main body portion formed with a bottom and partitioned by a pair of inner and a pair of outer transversely spaced vertical walls into a middle and two outer compartments in transverse alinement, a final drive gear housing carried by each side of the body in transverse alinement with the compartments, each outer compartment being open at one face, each housing including a vertical wall transversely spaced from a respective outer wall of the body, a drive pinion journaled in said two walls and formed with an axial internally splined portion, a shaft part journaled within the middle compartment in the two middle walls in axial alinement with the pinions, said shaft part having internally splined portions at opposite ends facing each outer compartment, a pair of clutch units, one located in each outer compartment and each comprising a driving part and a driven part, a shaft telescopically connecting each driving clutch part with the aforesaid shaft part, each shaft having a splined portion fitting the respective splined portion of said shaft part, and a stub shaft secured at its inner end to each driven clutch part for rotation therewith, each stub shaft having a splined outer portion fitting the splined portion of the respective drive pinion.

DAVID B. BAKER.
CLIFFORD R. ROGERS.
WILLIAM O. BECHMAN.